United States Patent [19]

Caramagne

[11] 4,124,089
[45] Nov. 7, 1978

[54] PHANTOM COIL COVER FOR AUTOMOBILES

[76] Inventor: Hugo Caramagne, 1233 Main Ave., Clifton, N.J. 07011

[21] Appl. No.: 824,045

[22] Filed: Aug. 12, 1977

[51] Int. Cl.² ............................................. B60R 25/00
[52] U.S. Cl. ................................ 180/114; 123/198 B; 307/10 AT; 336/90
[58] Field of Search ................... 180/114; 307/10 AT; 340/63, 64; 123/198 B, 198 DC, 198 DB; 70/243, 254; 336/90

[56] References Cited

U.S. PATENT DOCUMENTS

| 2,792,443 | 5/1957 | Catalano | 336/90 X |
| 2,861,644 | 11/1958 | Martin | 180/114 |
| 3,010,531 | 11/1961 | Flora | 180/114 |
| 3,343,625 | 9/1967 | Scheuermann | 180/114 |
| 3,581,259 | 5/1971 | Brunside | 336/90 |
| 3,720,284 | 3/1973 | Myers | 180/114 |
| 3,773,138 | 11/1973 | Killmeyer | 180/114 |
| 3,942,605 | 3/1976 | Burnside | 180/114 |

FOREIGN PATENT DOCUMENTS 1,455,489  2/1969  Fed. Rep. of Germany ........... 180/114

*Primary Examiner*—Joseph F. Peters, Jr.
*Assistant Examiner*—Terrance L. Siemens
*Attorney, Agent, or Firm*—Mel K. Silverman; David A. Jackson; Richard M. Goldberg

[57] ABSTRACT

A phantom coil cover comprising a coil housing having at least one opening at the bottom thereof, ignition coils disposed within the housing comprising a high voltage terminal and two low voltage terminals, and a coil housing cover secured to the top end of the coil housing, the housing cover comprising a high voltage terminal connector which is releasably attached to the high voltage terminal of the coils and two phantom low voltage terminals not connected to the coils.

8 Claims, 3 Drawing Figures

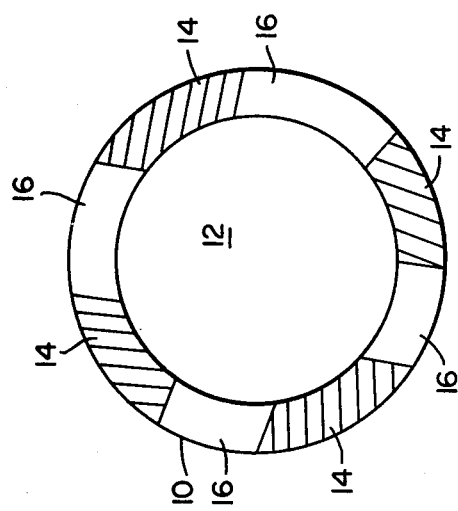
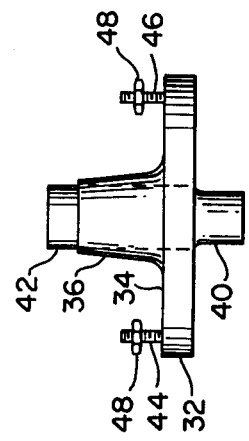
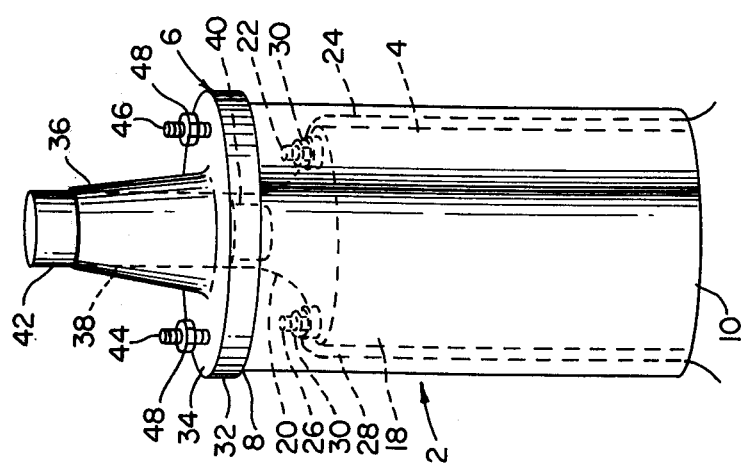

PHANTOM COIL COVER FOR AUTOMOBILES

BACKGROUND OF THE INVENTION

This invention relates to a phantom coil cover. More particularly, this invention relates to a phantom coil cover for the theft prevention of automotive vehicles.

Theft prevention devices for automotive vehicles are well known in the art. However, the majority of these devices utilize complex mechanisms of circuitry to accomplish this objective.

Additionally, very few of these devices utilize the ignition coils of the automotive vehicle to prevent theft prevention. For example, some of these devices have a circuit with a manually controlled switch, attached to the ignition coils, in which the switch will ground the circuit to the ignitioncoils when turned to its "on" position thereby preventing the vehicle from starting. See U.S. Pat. No. 3,010,531. Other prior art devices utilize a coil housing in which the ignition coils are placed. These latter devices have an engageable and removable coil housing cover whereby the cover can be disengaged from the coils and housing and the coils can be removed when leaving the vehicle. For example, see U.S. Pat. No. 3,581,259. Still other prior art devices utilize a housing for the ignition coils which is tamperproof. For example, see U.S. Pat. Nos. 2,242,142; 2,282,732; and 2,861,644. However, these latter housings can only be opened by a trained mechanic with special tools and only after a period of time which is long enough to discourage a thief.

The present application provides a unique solution to the above problem.

SUMMARY OF THE INVENTION

In accordance with the present invention, a phantom coil cover is provided, comprising a coil housing having at least one opening at the bottom thereof, ignition coils disposed within the housing comprising a high voltage terminal and two low voltage terminals, and a coil housing cover secured to the top end of said coil housing, the housing cover comprising a high voltage terminal connector which is releasably attached to the high voltage terminal of the coils and two phantom low voltage terminals not connected to the coils.

Accordingly, it is a principal object of the present invention to provide a phantom coil cover for theft prevention of automotive vehicles.

It is a further object of the present invention to provide a phantom coil cover for theft prevention of automotive vehicles in which the invention can be easily and economically used with all standard types of automotive vehicles without substantial modification of the vehicles.

It is a yet further object of the present invention to provide a phantom coil cover in which an automotive engine cannot be started by a thief by "hot wiring" a jumper wire directly from the battery to the ignition coils.

Further objects and advantages will become apparent to those skilled in the art from the ensuing description which proceeds with reference to the accompanying claims.

DESCRIPTION OF THE DRAWINGS

FIG. 1 is a perspective view of one embodiment of the present invention, showing the ignition coils in phantom disposed within the coil housing.

FIG. 2 is a bottom view of the coil housing of the present invention of FIG. 1.

FIG. 3 is a side view of the coil housing cover of the present invention of FIG. 1.

DESCRIPTION OF THE PREFERRED EMBODIMENTS

Referring to the drawings, FIG. 1 represents one embodiment of the present invention. A phantom coil cover is disclosed having a coil housing 2, ignition coils 4 and a coil housing cover 6.

Coil housing 2 is preferably of a cylindrical configuration, having its upper end 8 completely open and its lower end 10 partially open. As shown in FIG. 2, the lower end 10 of housing 2 includes a centrally located supporting base 12 fixedly connected to the outer periphery of lower end 10 by support connections 14. In this manner, openings 16 are provided in the lower end 10 of housing 2. Additionally coil housing 2 is preferably made of a rubber material and is oil and heat resistant.

The ignition coils 4 disposed within the housing 2 are conventional coils found in automotive vehicles. The coils 4 are disposed within their own coil container 18 having a standard socket-type high voltage terminal 20 extending therefrom to be connected to the distributor cap by means to be described.

The container 18 also has extending therefrom two threaded low voltage terminals, one terminal 22 to be connected to the ignition switch by wire 24 and a second terminal 26 to be connected to the distributor points by wire 28. Each low voltage terminal has a nut 30 threaded thereon for securing the wires 24 and 28 to the respective terminals.

The coil housing cover 6 includes a circular, peripheral flange 32 and a base 34 attached to the peripheral flange 32 at one end thereof, the base 34 having a frusto-conical section 36 centrally located on the base 34 and extending upward therefrom. Attached to by any suitable means and disposed within the frusto-conical section 36 is a high voltage terminal connector 38. The connector 38 is cylindrical in configuration and has a reduced diameter neck portion 40 at its lower end for attaching the connector 38 and the socket-type high voltage terminal 20 in electrical communication. The connector 38 also extends outwardly from the frusto-conical section 36 at its opposite end, creating a socket-type connection 42 for electrically connecting the same to the distributor cap by an appropriate wire (not shown).

Screw-threadedly attached to the base 34 of the housing cover 6 on opposite sides thereof are two phantom low voltage terminals 44 and 46 having appropriate phantom nuts 48 screw-threadedly received thereon.

In operation, the wires 24 and 28 are removed from the ignition coils 4 and the wires are pulled up through the openings 16 in the lower end 10 of housing 2. The coils 4 are then placed within housing 2 and the wires 24 and 28 are attached to the appropriate low voltage terminals 22 and 26. Housing cover 6 is then placed over the opening at the upper end 8 of housing 2 and connector 38 is attached to socket-type high voltage terminal 20.

The cover 6 may be more firmly attached to housing 2 by any suitable means. For example, housing 2 may include a peripheral lip at its upper end 8 and cover 6 may include a corresponding peripheral lip on its flange 32 for snaplocking the cover 6 onto the housing 2.

Upon assembling the unit as described above, a wire (not shown) is utilized to connect socket-type connection 42 to the distributor cap and two phantom wires (not shown) are attached to the phantom low voltage terminals 44 and 46 and draped inside the vehicle to simulate that these wires are actually connecting the low voltage terminals of the coils to their appropriate connections.

In this manner, when a potential thief lifts the hood of the vehicle and connects a jumper wire between the positive terminal of the battery to the appropriate phantom low voltage terminal to bypass the ignition switch and steal the vehicle, the engine will not start and the theft attempt will be thwarted.

An alternative embodiment of the present invention is one in which the housing cover 6 is fixedly attached to the housing 2 in its manufactured state and the housing 2 is completely open at its lower end 10. In this manner, the unit as a whole is slipped over the ignition coils 4 and the connector 38 is attached to high voltage terminal 20 in the same manner as previously described. The operation of the unit is the same as heretofore stated. It is to be understood that the invention is not limited to the illustrations described and shown herein which are deemed to be merely illustrative of the best modes of carrying out the invention, and which are suitable of modification of form, size, arrangement of parts and details of operation. The invention rather is intended to encompass all such modifications which are within the spirit and scope as defined by the claims.

What is claimed is:

1. A phantom coil cover for theft prevention of automotive vehicles, comprising:
   (a) a coil housing having at least one opening at the lower end thereof;
   (b) ignition coils disposed within said housing, comprising a high voltage terminal and two low voltage terminals; and
   (c) a coil housing cover secured to the upper end of said coil housing, said housing cover comprising a high voltage terminal connector releasably attached to said high voltage terminal of said ignition coils and two phantom low voltage terminals not connected to said ignition coils.

2. The phantom coil cover of claim 1 wherein said coil housing is of a cylindrical configuration.

3. The phantom coil cover of claim 1 wherein said coil housing is completely open at both ends thereof.

4. The phantom coil cover of claim 1 wherein said high voltage terminal of said ignition coils in a socket-type terminal.

5. The phantom coil cover of claim 1 wherein said high voltage terminal connector has a socket-type terminal at the end opposite the end attached to said high voltage terminal of said ignition coils.

6. A phantom coil cover for theft prevention of automotive vehicles, comprising:
   (a) a cylindrical coil housing completely open at its upper end and having at least one opening at the lower end thereof;
   (b) ignition coils disposed within said housing, comprising a high voltage terminal and two low voltage terminals; and
   (c) a coil housing cover secured to the upper end of said coil housing, said housing cover comprising a cylindrical high voltage terminal connector having a reduced neck portion at the lower end thereof which is releasably attached to said high voltage terminal of said ignition coils and a socket-type terminal at the upper end thereof, and comprising two phantom low voltage terminals not connected to said ignition coils.

7. The phantom coil cover of claim 6 wherein said coil housing includes a base member at the lower end thereof, said base member being of smaller diameter then said housing and attached to said coil housing by a plurality of spaced support connection members.

8. The phantom coil cover of claim 6 wherein said coil housing is completely open at the lower end thereof.

* * * * *